(12) United States Patent
Schwarzer

(10) Patent No.: US 12,709,666 B2
(45) Date of Patent: Aug. 18, 2026

(54) METHOD AND SYSTEM FOR FEEDING A LIQUID ORGANIC PEROXIDE TO A POLYMER MELT PROCESSING EQUIPMENT

(71) Applicant: Lummus Novolen Technology GmbH, Mannheim (DE)

(72) Inventor: Sebastian Schwarzer, Mannheim (DE)

(73) Assignee: Lummus Novolen Technology GmbH, Mannheim (DE)

( * ) Notice: Subject to any disclaimer, the term of this patent is extended or adjusted under 35 U.S.C. 154(b) by 680 days.

(21) Appl. No.: 18/248,182

(22) PCT Filed: Oct. 6, 2021

(86) PCT No.: PCT/EP2021/077609

§ 371 (c)(1),
(2) Date: Apr. 6, 2023

(87) PCT Pub. No.: WO2022/074070

PCT Pub. Date: Apr. 14, 2022

(65) Prior Publication Data

US 2023/0383066 A1 Nov. 30, 2023

(30) Foreign Application Priority Data

Oct. 6, 2020 (EP) .................................... 20200266

(51) Int. Cl.
*C08J 3/205* (2006.01)
*C08J 3/24* (2006.01)
*C08K 5/14* (2006.01)

(52) U.S. Cl.
CPC ............... *C08J 3/2053* (2013.01); *C08J 3/24* (2013.01); *C08K 5/14* (2013.01); *C08J 2323/12* (2013.01)

(58) Field of Classification Search
CPC ....... C08J 3/24; C08J 2323/12; C08K 5/0025; C08K 5/14; C08K 5/0033; C08L 2023/42; C08L 23/26; C08L 23/00; C08L 10/00
See application file for complete search history.

(56) References Cited

U.S. PATENT DOCUMENTS 3,144,436 A 8/1964 Greene
4,578,430 A 3/1986 Davison
(Continued)

FOREIGN PATENT DOCUMENTS

CN 1291213 A 4/2001
CN 107073421 A 8/2017
(Continued)

OTHER PUBLICATIONS

International Search Report issued in International Application No. PCT/EP2021/077609 dated Jan. 21, 2022 (4 pages).
(Continued)

*Primary Examiner* — Mark S Kaucher
(74) *Attorney, Agent, or Firm* — Osha Bergman Watanabe & Burton LLP

(57) ABSTRACT

The disclosure relates to a method and a system for feeding a liquid organic peroxide to a polymer melt processing equipment. The feeding method comprises transporting at least one liquid organic peroxide (13) in undissolved admixture with an inert liquid cooling carrier (4) from a controlled-temperature section (3) to a polymer melt processing equipment.

10 Claims, 1 Drawing Sheet

(56) References Cited

U.S. PATENT DOCUMENTS

| | | | | |
|---|---|---|---|---|
| 5,405,917 | A * | 4/1995 | Mueller, Jr. | C08F 8/50 525/240 |
| 6,060,584 | A | 5/2000 | Neely | |
| 6,103,833 | A * | 8/2000 | Hogt | C08F 8/50 525/387 |
| 2003/0038083 | A1 * | 2/2003 | Schiestel | B01D 53/12 210/663 |
| 2018/0030163 | A1 * | 2/2018 | Wittner | C08L 23/16 |

FOREIGN PATENT DOCUMENTS

| | | | |
|---|---|---|---|
| CN | 107466308 | A | 12/2017 |
| CN | 111051410 | A | 4/2020 |
| EP | 3056531 | A1 | 8/2016 |
| JP | 4-348148 | B2 | 10/2009 |
| JP | 55-65509 | B2 | 8/2014 |
| JP | 2018-505293 | A | 2/2018 |
| WO | 98/37107 | A1 | 8/1998 |
| WO | 99/36466 | A1 | 7/1999 |
| WO | 2016/059342 | A1 | 4/2016 |

OTHER PUBLICATIONS

Written Opinion issued in International Application No. PCT/EP2021/077609 dated Jan. 21, 2022 (6 pages).

Office Action issued in Chinese Application No. 202180067698.7, mailed on May 17, 2025 (8 Pages).

Office Action issued in Brazilian Application No. BR112023005309-9, mailed on Jul. 10, 2025 (4 pages).

Office Action issued in Japanese Application No. JP2023-521135 mailed on Jul. 23, 2024 (11 pages).

* cited by examiner

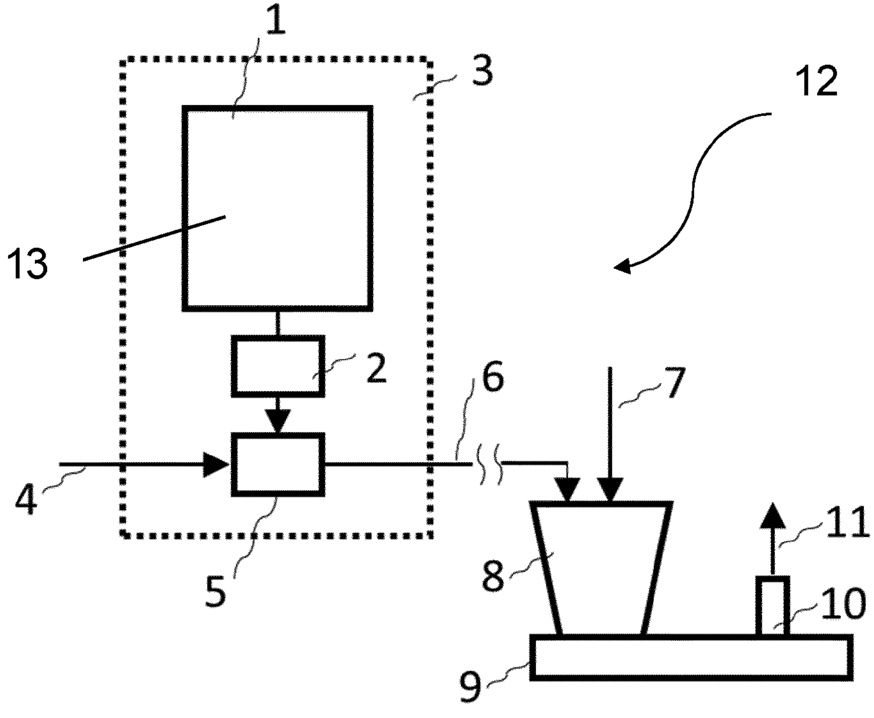
1
3
12
13
2
6
7
4
11
5
8
10
9

METHOD AND SYSTEM FOR FEEDING A LIQUID ORGANIC PEROXIDE TO A POLYMER MELT PROCESSING EQUIPMENT

BACKGROUND OF INVENTION

Technical Field

The present disclosure relates to a method for feeding at least one liquid organic peroxide to a polymer melt processing. The present disclosure also relates to a corresponding system.

Background Art

It is known to use organic peroxides, generally liquid organic peroxides, for the rheological modification of polyolefins, including "visbreaking" and cross-linking thereof. Cross-linking is conventionally applied, for example, to polyethylene.

A known process for visbreaking polyolefins is extrusion performed at a temperature of about 190° C.-260° C. in the presence of an organic peroxide compound. An example of this process is described in document AU 5141785 A.

However, due to their organic nature, pure organic peroxides are very unstable, volatile and dangerous species with high risk of ignition or explosion in case of uncontrolled increase of temperature and therefore require particular handling precautions. This behavior may be incompatible with the rules for transportation and storage and/or require special efforts for safe handling and storage, thus making the use of pure organic peroxides very expensive and technically complex. Also, the use of pure organic peroxides in polymer melt processes, such as for example extrusion processes, which are performed at high temperatures, is still more dangerous.

Accordingly, safe handling and transport is a significant concern with liquid organic peroxides and the use of pure liquid organic peroxides as well as, at least to some extent, the use of some diluted liquid organic peroxides in polymer melt processes might become problematic.

In the attempt of solving the issues relating to storage and transportation, liquid organic peroxides have been diluted with mineral oil. By diluting the organic peroxide, less restricted peroxide product safety classes may be obtained. Also, dispersion of an organic peroxide in a polymer, for example a polyolefin, may be assisted by the dilution of the organic peroxide in mineral oil. However, the mineral oil causes several unwanted side effects impacting the polymer properties. For example, currently available mineral oil diluted organic peroxides provide no safety issue, allowing greater storage capacities with respect to those obtainable with pure organic peroxides, but introduce solvent into the polymer, which may disturb the polymer conversion into the final polymer products and may lead to additional degradation of by-products during the peroxidic reaction in the extruder. These degradation and by-products may induce high volatiles organic compounds (VOCs) and undesired odors to the polymer and the final polymer product.

A method for modifying the rheology of a polymer is described in US 2018/0030163 A1. This method comprises extruding a molten polymer and a composition comprising at least one organic peroxide and water in emulsion form, and removing volatile compounds from the molten polymer. The volatile compounds comprise volatile organic compounds and water. However, US 2018/0030163 A1 disregards the way the organic peroxide is handled upstream of the extruder, and in particular the way the organic peroxide is transported from the storage of organic peroxide to the extruder.

With more general reference to transportation of liquid organic peroxides from a first location (e.g., storage of the organic peroxide) to a second location (e.g. the location where the organic peroxide is used), it is generally known to transport these liquids by means of pipes provided with temperature control means. For example, a pipe may be arranged, in the whole extension thereof, within a temperature-controlled enclosure. Such an enclosure has to be designed to maintain the pipe at the desired controlled temperature from the first location to the second location, which requires additional equipment and relating costs. In addition to arranging the entire pipe in a temperature-controlled enclosure, a further example known in the art of transporting organic peroxides is that of using jacketed pipes. A still further example is that of providing the pipes with external heat tracing measures. Regardless of the type of known temperature control means, in any case these means are unsuitable to cover the long distances typical of industrial sites using liquid organic peroxides as starting materials or additives in a manufacturing process.

In all these examples of the art, a specific equipment has to be provided to ensure that the pipe used to transport liquid organic peroxides is maintained within the temperature limits required for safely transporting these liquids.

Thus, there is still the need of developing a method and a system for safely transporting liquid organic peroxides in industrial sites, including in cases in which the organic peroxide is intended to be used in a polymer melt process or equipment, without impacting or altering the final properties of the polymer subjected to melt processing.

SUMMARY OF INVENTION

The Applicant has surprisingly found that by transporting a liquid organic peroxide in undissolved admixture with (i.e., in suspension in) an inert cooling carrier that is an aqueous liquid at ambient temperature and volatile under melt processing conditions, it is possible to safely deliver the organic peroxide from any location, such as a temporary or long-term storage thereof, to a polymer melt processing equipment without using a specifically designed equipment or device for controlling the temperature of the liquid organic peroxide, but simply by means of any common pipe, tube or hollow body suitable for transporting liquids.

This finding also allows to limit the use of temperature control means (such as enclosures, containers, and devices configured for this purpose) to the storage of the organic peroxide only, for example in the form of a dedicated, temperature-controlled container, thus reducing the energy consumption.

Additionally, transporting a liquid organic peroxide in undissolved admixture with an inert cooling carrier as defined above results in a safe transport of the liquid organic peroxide regardless of the distance to be covered to reach the polymer melt processing equipment, for example the distances involved in an industrial plant for polymer melt processing. As a consequence, this transport is simple and suitable for any size of plant and requires a limited investment.

The Applicant has found that the same technical effects may be attained also when a plurality of liquid organic peroxides are transported to a polymer melt processing equipment.

According to a first aspect thereof, the present disclosure relates to a method for feeding a liquid organic peroxide to a polymer melt processing equipment, the method comprising mixing at least one liquid organic peroxide and an inert cooling carrier in a mixing section arranged in a controlled-temperature section, mixing being performed without dissolving the at least one liquid organic peroxide in the inert cooling carrier. The method further comprises transporting the at least one liquid organic peroxide in undissolved admixture with the inert cooling carrier from the controlled-temperature section, to a polymer melt processing equipment arranged outside the controlled-temperature section. The inert cooling carrier comprises an aqueous liquid at ambient temperature and is volatile under melt processing conditions. For example, the controlled-temperature section may include any type of reservoir of the liquid organic peroxide(s), such as for example a temporary or long-term storage of the liquid organic peroxide(s).

The inert cooling carrier may be any aqueous carrier which is inert with respect to the at least one organic peroxide, which is liquid at ambient temperature and pressure and which is capable of maintaining the temperature of the at least one organic peroxide within the temperature limits required for safely transporting the peroxide, such as, for example, from 5° C. to 40° C., depending on the liquid organic peroxide. For example, the inert cooling carrier may be an aqueous liquid immiscible with the liquid organic peroxide or with all liquid organic peroxides, when a combination of liquid organic peroxides is used. According to the present disclosure, the inert cooling carrier does not act as a solvent, i.e., the inert cooling carrier does not dissolve the least one liquid organic peroxide, but keeps the least one liquid organic peroxide in suspension. According to one or more embodiments, the at least one organic peroxide and the inert cooling carrier may be transported to the polymer melt processing equipment in an unstable mixture.

Such a method as defined in the first aspect of the disclosure is effective for the safe transport of any liquid organic peroxide, and is suitable for integrating any controlled-temperature reservoir or storage and any polymer melt processing equipment into a single, simplified plant, without requiring specifically designed enclosures, devices or piping for safely feeding the liquid organic peroxide to the polymer melt processing equipment. This integration may be successfully implemented, with reduction of energy consumption with respect to methods of the prior art, also in case of a high throughput polymer melt processing equipment or plant, such as for example a high throughput extrusion plant.

According to one or more embodiments, the method comprises transporting one or more liquid organic peroxides in undissolved admixture with the inert cooling carrier.

The liquid organic peroxide may be any organic peroxide in liquid form.

According to one or more embodiments, the at least one liquid organic peroxide may comprise at least one dialkyl peroxide, such as for example 2,5-dimethyl-2,5-di(t-butylperoxy)hexane, 2,5-dimethyl-2,5-di(tert-butylperoxy) hexane-3, di(tert-butylperoxy-isopropyl)-benzene, dicumyl peroxide, 3,6,9-triethyl-3,6,9-trimethyl-1,4,7-triperoxonane, 3,3,5,7,7-pentamethyl-1,2,4-trioxepane and combinations thereof.

According to one or more embodiments, the inert cooling carrier is volatile at under-atmospheric pressure, for example at a pressure of from 1000 mbar(a) to 800 mbar(a), and for example between 800 mbar(a) and 600 mbar(a), at a temperature of from 5° C. to 80° C.

According to the present disclosure, the inert cooling carrier comprises an aqueous cooling carrier. For example, the cooling carrier may be water. The water may be distilled or deionized (e.g. demineralized) water, for example containing less than 2%, less than 1%, less than 0.5%, less than 0.1% or no dissolved compounds such as salts. When the water is distilled, water may contain not only this or a lower content of salts, but also less than 2%, less than 1%, less than 0.5%, less than 0.1% or no organic compounds.

By using water as a carrier, it is possible to contact a polymer with the transported undissolved mixture of liquid organic peroxide(s) and the aqueous carrier under melt processing conditions and then easily remove the aqueous carrier.

Additionally, any volatile compounds may also be removed from the molten polymer. Whenever this is desired, a modification of the rheology of the polymer may also be performed in the melt processing equipment. Removal of any volatile compounds may reduce the concentration of degradation and by-products in the polymer, which results in less VOCs, lower odor concentrations in the polymer and reduced color formation. Also, an aqueous cooling carrier or water as carrier may deactivate any active catalyst sites remaining in the polymer. Therefore, polymer deactivation can be accomplished in the melt processing equipment, without requiring a specific deactivation apparatus. Also, by providing a sufficient mixing in the melt processing equipment, the deactivation may be uniform and may be obtained in an efficient manner.

According to one or more embodiments, the method comprises feeding the aqueous cooling carrier or water to be admixed with the at least one liquid organic peroxide at a predetermined temperature. For example, water may be fed at a temperature of from 5° C. to 40° C.

According to one or more embodiments, the melt processing equipment comprises an extruder or kneader. The melt processing equipment may comprise, for example, a single or twin-screw extruder, separately or in combination. Independently from the type of extruder, according to one or more embodiments, the method may comprise feeding the mixture of liquid organic peroxide(s) and water into the feed hopper of the extruder. Alternatively, the mixture of peroxide and the cooling carrier can be injected into the processing unit of the plastic processing equipment immediately downstream the feed hopper of the processing equipment, i.e., at a location where the polymer fed through the feed hopper can be estimated to be still in solid condition.

According to one or more embodiments, the method further comprises storing the at least one liquid organic peroxide in the controlled-temperature section. In this manner, the method permits to feed the at least one liquid organic peroxide directly from a location where the at least one liquid organic peroxide is stored.

According to the present disclosure, the method further comprises mixing, for example mechanically mixing, the at least one liquid organic peroxide and the inert cooling carrier in a mixing section arranged in the controlled-temperature section. According to one or more embodiments, a single controlled-temperature section may be sufficient to control the temperature of both storing and mixing. For example, a common controlled-temperature section may safely house both a reservoir or storage for storing the at least one liquid organic peroxide and a mixer for mixing the at least one liquid organic peroxide with the inert cooling carrier.

According to one or more embodiments, the method further comprises feeding the inert cooling carrier to the mixing section, for example in a continuous manner.

According to one or more embodiments, the method further comprises feeding the inert cooling carrier to the mixing section at a predetermined flow rate, which may be for example constant or variable. By way of example, this predetermined flow rate may be of from 1000 ppm to 5000 ppm, from 1200 ppm to 4000 ppm, from 1500 ppm to 3000 ppm, from 2000 ppm to 3000 ppm, based on the plastic processing equipment throughput (where ppm, throughout the present disclosure and the following claims, indicates mg/kg, and is thus ppm wt). For example, the flow rate of the inert cooling carrier may be at least twice the flow rate of the liquid organic peroxide. For example, the flow rate of the inert cooling carrier may be three times higher than the flow rate of the liquid organic peroxide. Depending on the need, the method may further comprise adjusting the flow rate of the inert cooling carrier as a function of the flow rate of the liquid organic peroxide(s), which may be in turn constant or variable. Depending on the need, for example depending on the way the polymer melt processing is performed and the flow rate at which the polymer is fed, the method may further comprise adjusting the flow rate of the liquid organic peroxide(s) and unchanged flow rate of the inert cooling carrier.

According to one or more embodiments, the method further comprises pumping the least one liquid organic peroxide from a storage to the mixing section at a predetermined flow rate, which may be for example constant or variable. By way of example, this predetermined flow rate may be of from 10 ppm to 6000 ppm, from 30 ppm to 6000 ppm, from 50 ppm to 6000 ppm, from 50 ppm to 5000 ppm, from 100 ppm to 4000 ppm, from 200 ppm to 2000 ppm, from 300 ppm to 800 ppm, based on the plastic processing equipment throughput. Depending on the need, for example depending on the way the polymer melt processing is performed and the flow rate at which the polymer is fed, the method may further comprise adjusting the predetermined flow rate of the at least one liquid organic peroxide.

According to one or more embodiments, the polymer comprises or consists of a polyolefin.

According to one or more embodiments, the polyolefin may be selected, for example, from homopolymers and copolymers of olefins, the olefin monomers having for example from two to eight carbon atoms.

According to one or more embodiments, the polyolefin may be selected from the group comprising polypropylene homopolymers, polyethylene homopolymers, copolymers comprising propylene, copolymers comprising ethylene and combinations thereof. For example, the polyolefin may be selected from the group consisting of polypropylene homopolymers, propylene copolymers, polyethylene homopolymers and ethylene copolymers.

According to one or more embodiments, polyethylene, such as linear low-density polyethylene (LLDPE), low-density polyethylene (LDPE), high density polyethylene (HDPE) as well as ethyl vinyl acetate copolymer (EVA) and polyolefinic elastomer (POE), may be used. According to one or more embodiments, polyethylene homopolymers and copolymers, for example having a density in the range from 0.88 g/cm 3 to 0.96 g/cm 3, may be used. Polyethylene homopolymers and copolymers may be manufactured by any known process.

According to one or more embodiments, polypropylene may be used, comprising homopolymers, random copolymers, block copolymers and terpolymers of propylene. Copolymers of propylene may comprise copolymers of propylene with other olefins such as ethylene, 1-butene, 2-butene and pentene isomers, and for example copolymers of propylene with ethylene. Terpolymers of propylene may comprise copolymers of propylene with ethylene and one other olefin. Random copolymers, also known as statistical copolymers, are polymers in which the propylene and the comonomer(s) are randomly distributed throughout the polymeric chain in ratios corresponding to the feed ratio of the propylene to the comonomer(s). Block copolymers are made up of chain segments consisting of propylene homopolymer and of chain segments consisting of, for example, random copolymer of propylene and ethylene. Homopolymers, random copolymers and block copolymers may be manufactured by any known process.

According to a second aspect thereof, the present disclosure relates to a method for melt processing a molten polymer comprising the method for feeding at least one liquid organic peroxide to a polymer melt processing equipment as defined in any one of the embodiments disclosed herein. The method for melt processing the molten polymer further comprises melt processing the molten polymer in the presence of the at least one organic peroxide and the inert cooling carrier in the polymer melt processing equipment, and removing the inert cooling carrier from the molten polymer. Melt processing may comprise extruding and, optionally, rheologically modifying polymers, for example comprising polymer degradation and/or cross-linking. The method for melt processing may further comprise, in addition to removing the inert cooling carrier, also removing any additional volatile compounds from the molten polymer.

According to one or more embodiments, the polymer melt processing equipment may comprise an extruder.

For example, the volatile compounds removed may comprise, in addition to the aqueous cooling carrier or water, volatile organic compounds.

According to one or more embodiments, the above-mentioned melt processing a molten polymer in the presence of the at least one organic peroxide and the inert cooling carrier in the polymer melt processing equipment may comprise extruding a molten polymer and an undissolved mixture of the at least one organic peroxide and the inert cooling carrier. According to one or more embodiments, extruding a molten polymer and the undissolved mixture may be performed by extruding the polymer, which may be for example in an initial powder or pellet form, adding the above-mentioned mixture to the polymer, and melt extruding the polymer in the presence of said mixture. Adding the mixture to the polymer may be for example performed before or during the extrusion of the polymer. According to one or more embodiments, the mixture may be added to the polymer in such a manner that the amount of the at least one organic peroxide with respect to the amount of the polymer attains at a predetermined value. For example, the mixture may be added to the polymer so that the amount of the at least one peroxide added to the polymer ranges from 100 ppm to 6000 ppm, from 200 ppm to 5000 ppm, from 300 ppm to 4000 ppm, with respect to the amount of the polymer. According to one or more embodiments, the mixture may be added to the polymer so that the amount of the at least one peroxide added to the polymer ranges from 100 ppm to 3000 ppm, with respect to the amount of the polymer.

Extruding may be performed in an extruder or in any other melt processing device. In both cases, extruding is performed under extrusion conditions. The inert cooling carrier, under extrusion conditions, may be in vapor form and, when removed, for example by venting the extruder, may extract undesired deactivated species and degradation products from the molten polymer in an enhanced manner. The enhanced degassing of undesired degradation products and by-products obtained by removing the vapor under extrusion conditions further reduces both VOCs and odor concentrations. As a consequence, an improved polymer degassing may be obtained during the melt processing of the polymer. Thus, the method according to one or more embodiments of the present disclosure results not only in a safe and simple transport of the at least one liquid organic peroxide and in a melt processing of the polymer by contacting the at least one organic peroxide with the molten polymer under extrusion conditions, but also in an effective extraction of the inert cooling carrier as well as of any deactivated species and degradation products from the molten polymer.

According to one or more embodiments, extruding may be performed in the presence of one or more polymer additives. Exemplary additives may comprise, for example, fillers, antioxidants, fungicides, bactericides, reinforcing agents, antistatic agents, heat stabilizers, UV-stabilizers, flow enhancers, colorants and other additives or processing aids known to those skilled in the art.

According to one or more embodiments, extruding may be performed in an extruder at predetermined extrusion conditions suitable for extruding a polymer, such as for example at a predetermined extrusion temperature and at a predetermined extrusion throughput. With reference to an extruder, unless otherwise indicated, in the present description and in the following claims the exemplary extrusion temperatures and pressures are intended to indicate the barrel temperatures and pressures.

For example, extruding may be performed at an extrusion temperature of from 180° C. to 260° C., for example from 190° C. to 250° C., for example from 190° C. to 240° C.

According to one or more embodiments, the extrusion conditions may vary along the length of the extruder. For example, the extrusion temperature may increase or decrease along at least a portion of an extrusion path, which may extend along different extruder zones.

Independently from or in combination with a possible variation of the temperature along the length of the extruder, also the extrusion pressure may vary along the length of the extruder. For example, the extrusion conditions may comprise a feed zone pressure of from mbar to 50 mbar and a melt compression zone of from 30 bar to 120 bar. The remaining zones may have pressures intermediate to the exemplary pressures of the feed zone and of the melt compression zone.

The extrusion conditions may further comprise an intensive mixing in the extruder. According to one or more embodiments, sufficient mixing may be obtained by varying the screw speed of the extruder within the range of from 2 m/s to 6 m/s based on circumferential speed.

According to one or more embodiments, polymer powder or pellets and the mixture may be fed into the extruder, which may be for example a single or twin-screw extruder, separately or in combination.

When fed in combination, the polymer powder or pellets and the mixture may be optionally premixed, for example at a temperature of from 30° C. to 40° C.

The polymer powder or pellets and the mixture may be fed separately into the extruder at predetermined feed rates. For example, the feed rate of the polymer may be set within the range of 2 to 500 kg/h for lab extruders and within the range of 5 ton/h to 100 tons/h for industrial extruders, and the feed rate of the mixture may be adjusted to obtain a final pellet having a desired MFR.

According to one or more embodiments, the undissolved mixture, when fed separately from the polymer, may be added to the extruder in a continuous manner or in a discontinuous manner, stepwise or gradually.

According to one or more embodiments, the temperatures of the different zones of the extruder, which may be set within predetermined exemplary ranges of temperatures known in the art in a steady state, may be set at lower values, before the mixture is introduced. For example, the temperatures of the different zones of the extruder may be set within ranges of temperatures which are at least 10° C.-20° C. lower than the corresponding steady-state extrusion temperatures. However, the mixture may be also introduced after the temperatures of the different zones of the extruder have attained the steady-state ranges of temperatures.

According to one or more embodiments, the mixture feed rate into the extruder may be gradually increased up to a predetermined value, which may change as a function of the desired final MFR of the pellet. The final MFR may be measured by means of an online rheometer, for example mounted on a die zone of the extruder.

Before increasing the mixture feed rate into the extruder to a steady-state value, the temperatures of the barrel and the die zone may be either maintained at the same temperatures set before the mixture is introduced or may be further reduced, for example by 5° C.-10° C.

According to one or more embodiments, removing is performed by venting the polymer melt processing equipment. For this purpose, the polymer melt processing equipment may for example comprise a decompression zone including a venting zone.

According to one or more embodiments, the polymer melt processing equipment comprises an extruder comprising at least one decompression zone including a venting zone, for example including at least one vent port or a plurality of vent ports. The at least one decompression zone may, for example, be arranged about two-thirds down the extruder screw. The decompression zone allows gases, such as moisture and volatiles, including the inert cooling carrier, to escape from the molten polymer through the venting zone, for example through one or more vent ports provided in the venting zone.

By using a vented extruder comprising at least one vent port, the pressure may be relieved in the at least one decompression zone and any trapped gases may be drawn out by vacuum. With such an extruder, the method according to one or more embodiments of the present disclosure provides additional effects positively influencing the properties of polymers, for example of polyolefins. These effects include the deactivation of active catalyst sites and improved polymer degassing beyond the expectation of the contribution of the water and organic peroxide individually. The deactivation of active catalyst sites and improved polymer degassing in turn result in purer polymers containing less reaction by-products and amount of volatiles, improved organoleptic properties, such as odor and taste, and less color formation. Further, the water of the composition, when removed through the at least one vent port, extracts undesired deactivated species and degradation products from the molten polymer.

According to one or more embodiments, removing is performed by venting the extruder, for example during extruding. Venting may be for example performed through at least one vent or vacuum port, in an extruder venting zone. According to one or more embodiments, a plurality of vent ports may be defined circumferentially around the barrel and/or longitudinally along a portion of the barrel.

The vent port(s) may strip-off the reaction water and undesired deactivation species by means of a predetermined vacuum (i.e., subatmospheric pressure) to assure that no residual water is present in the polymer.

According to one or more embodiments, removing is performed by establishing a predetermined vacuum in the extruder venting zone or in a plurality of venting zones. In case of a plurality of venting zones, each venting zone may be provided in a corresponding decompression zone of the extruder comprising a plurality of decompression zones. However, according to one or more embodiments, a plurality of venting zones may be provided in each decompression zone of the extruder.

According to one or more embodiments, the predetermined vacuum is set to from 0 mbar to 800 mbar, for example from 200 mbar to 800 mbar, for example from 300 mbar to 600 mbar, for example from 350 mbar to 550 mbar. According to one or more embodiments, removing may be performed by setting a predetermined vacuum pressure in the extruder decompression zone comprising a venting zone. For example, the decompression zone vacuum pressure may be of from 0 mbar to 800 mbar.

For example, the subatmospheric pressure in the venting zone can be maintained by attaching the at least one vent port to a tube leading to a vacuum pump or other known devices for producing vacuum.

According to one or more embodiments, the polymer melt processed by the method may comprise any of the exemplary polymers defined above.

For example, the polymer to be melt processed may be a propylene homopolymer or copolymer. According to one or more embodiments, the propylene homopolymer or copolymer, before the melt processing, may have an initial MFR, measured according to ISO 1133 with a load of 2.16 kg at 230° C., of about 0.2 g/10 min to about 100 g/10 min, for example from 0.2 g/10 min to 50 g/10 min, for example from 0.2 g/10 min to 20 g/10 min.

In the description and claims, if not otherwise indicated, the MFR is a MFR measured according to ISO 1133 with a load of 2.16 kg at 230° C.

According to one or more embodiments, the propylene homopolymer or copolymer, after the melt processing with one or more embodiments of the mixture, may have a final MFR, of up to 5000% higher than the initial MFR. According to one or more embodiments, the final MFR may be of from 50 g/10 min to 2000 g/10 min, for example of from 20 g/10 min to 100 g/10 min, for example of from 5 g/10 min to 20 g/10 min.

According to a further aspect thereof, the present disclosure relates to a polymeric composition obtained by one or more of the embodiments of the method defined above.

The polymeric composition may be used to prepare different product applications, such as for example molding, films and fibers applications. Examples of product applications are injection and blow molding products, such as for example injection and blow molding products used for packaging and automotive application. Spunbond nonwoven and melt blown fibers applications, such as for example for hygiene, medical, automotive and geotextile applications, may also be exemplary applications for the polymeric composition.

According to a further aspect thereof, the present disclosure relates to the use of distilled or deionized water, as an inert cooling carrier of at least one organic peroxide to a polymer melt processing equipment.

According to one or more embodiments, water may have one or more of the properties indicated in any one of the embodiments described above with reference to any of the methods.

According to a further aspect thereof, the present disclosure relates to a system for feeding a liquid organic peroxide to a polymer melt processing equipment. The system comprises a temperature-controlled section including a storage of at least one organic peroxide and a mixer for mixing the at least one liquid organic peroxide with an inert liquid cooling carrier without dissolving the at least one liquid organic peroxide. The system further comprises a pipe configured to put the mixer in fluid communication with a polymer processing equipment arranged outside the temperature-controlled section. The pipe is not provided with any cooling means, such as, for example, a cooling jacket, a double wall for circulating a cooling medium therein or any external cooling devices or the like. Indeed, in accordance with one or more embodiments, the inert liquid cooling carrier may perform the cooling function in a satisfactory, effective and simple manner. Accordingly, the system may comprise a conventional pipe which may be conveniently and safely used to transport the at least one liquid organic peroxide in admixture with an inert liquid cooling carrier from the controlled-temperature section to the polymer melt processing equipment.

According to one or more embodiments, the pipe may have a length of from 5 m to 200 m, for example from 10 m to 100 m.

According to one or more embodiments, the pipe comprises a single-wall pipe.

According to one or more embodiments, the pipe may comprise a plurality of sections having different lengths and/or arranged along different directions. For example, the plurality of sections may be connected to each other by straight or curved connectors, joints, elbows and similar connecting means.

According to one or more embodiments, the mixer comprises or is a static mixer, for example for the continuous mixing of liquids.

According to one or more embodiments, the temperature-controlled section further comprises an injector for injecting the inert liquid cooling carrier to the mixer at a predetermined temperature, for example from 5° C. to 25° C. For example, the injector may be configured to inject the inert liquid cooling carrier fluid within a lower and upper temperature limit to prevent freezing and heating up of the at least one liquid organic peroxide, respectively. For this purpose, the injector may be provided with a temperature adjuster.

According to one or more embodiments, the injector may be configured to inject the inert liquid cooling carrier to the mixer at a predetermined flow rate, for example from 1000 ppm to 5000 ppm based on the polymer throughput of the processing equipment, for example in an adjustable manner.

According to one or more embodiments, the temperature-controlled section further comprises a pump for pumping the at least one organic peroxide to the mixer at a predetermined flow rate, for example from 10 ppm to 6000 ppm, from 10 ppm to 5000 ppm, based on the throughput of the polymer processing equipment. For example, the pump may be any liquid metering pump suitable for injecting a metered amount of liquid into another liquid.

The polymer melt processing equipment may comprise an extruder and may comprise any of the exemplary features described above with reference to a polymer melt processing equipment which may be used in embodiments of the above-mentioned methods.

BRIEF DESCRIPTION OF DRAWINGS

FIG. 1 illustrates a schematic view of a system for modifying the rheology of a polymer according to one embodiment of the present disclosure.

DESCRIPTION OF EMBODIMENTS

The following examples of methods and systems for feeding at least one liquid organic peroxide to a polymer melt processing equipment and for melt processing a polymer are given for illustrating but not limiting purposes.

A system for melt processing a polymer according to one embodiment of the present disclosure is schematically shown in FIG. 1 and is generally indicated by reference number 12. The melt processing of a polymer may for example comprise degradation and/or cross-linking of the polymer, which may be for example polypropylene.

The system 12 comprises a system for feeding a liquid organic peroxide to a polymer melt processing equipment, which system will be described in more detail below, and a melt processing equipment comprising a venting zone 10.

In the embodiment shown in FIG. 1, the melt processing equipment is an extruder 9 arranged outside a temperature-controlled section, which is generally designated by reference number 3. However, the system may comprise any type of melt processing equipment arranged outside the temperature-controlled section 3.

The extruder 9 comprises a feed hopper 8, a melt compression zone (not shown), and a decompression zone including the venting zone 10, which is arranged downstream the feed hopper 8. The venting zone 10 may be provided with at least one venting port (not shown). The extruder 9 may be a twin screw extruder, such as for example a co-rotating closely intermeshing twin screw extruder.

For example, the temperature-controlled section 3 may have the form of an enclosure maintained at a predetermined temperature, for example from 10° C. to 20° C., by means of HVAC.

In the embodiment shown in FIG. 1, the temperature-controlled section 3 comprises a storage 1, for example a storage tank, of a liquid organic peroxide 13 which may be, for example, 2,5-dimethyl-2,5-di(tert-butylperoxy)hexane, and a mixer 5 for mixing the liquid organic peroxide 13 with an inert aqueous cooling carrier 4, which may be, for example, demineralized water. For example, demineralized water may contain less than 2%, less than 1%, less than 0.5%, less than 0.1% or no dissolved compounds such as salts. The storage tank may be any storage tank known in the art of storing liquid organic peroxides in a safe manner and complying with established safety rules for this type of materials. The mixer 5 may be a static mixer for the continuous mixing of liquids.

The temperature-controlled section 3 further comprises an injector (not shown in detail) for injecting the inert aqueous cooling carrier 4 to the mixer 5. The injector may inject the inert aqueous cooling carrier 4 at a predetermined flow rate, for example from 1000 ppm to 5000 ppm related to the polymer processing equipment throughput. For example, the flow rate of the inert aqueous cooling carrier 4 may be at least twice the flow rate of the liquid organic peroxide 1, for example three times higher than the flow rate of the liquid organic peroxide 1. The injector may inject the inert aqueous cooling carrier 4 at a predetermined temperature, for example from 5° to 25° C., depending on the liquid organic peroxide 13. For this purpose, the injector may be provided with a temperature adjuster. The temperature of the inert aqueous cooling carrier 4 may be selected and/or adjusted within a lower and upper temperature limit to prevent freezing and heating up of the liquid organic peroxide 13, respectively. For example, when the liquid organic peroxide 13 is 2,5-dimethyl-2,5-di(tert-butylperoxy)hexane, this temperature may range from 10° C. to 40° C.

The temperature-controlled section 3 further comprises a pump 2 for pumping the liquid organic peroxide 13 to the mixer 5 at a predetermined flow rate, for example from 50 ppm to 6000 ppm related to the polymer processing equipment throughput. For example, the pump 2 may be any liquid metering pump suitable for injecting a metered amount of liquid into another liquid.

The system for feeding a liquid organic peroxide to the extruder 9 comprises the temperature-controlled section 3 and a pipe 6 configured to put the mixer 5 in fluid communication with the extruder 9 arranged outside the temperature-controlled section 3. The pipe 6 is not provided with any external temperature control means, such as, for example, a cooling jacket or a double wall for circulating a cooling medium therein or the like. Indeed, the cooling function of the liquid organic peroxide 13 is performed by the inert aqueous cooling carrier 4. Accordingly, the pipe 6 may be a conventional, single-wall pipe, which does not need to be provided with any specific cooling means. The pipe 6 may have a length of from 5 m to 200 m, but different lengths are possible, depending on the size of the system 12 for melt processing a polymer and on the layout of the apparatus thereof.

According to embodiments of the present disclosure, an exemplary method for melt processing a polymer, including for example degradation and/or cross-linking of polypropylene, by using at least one organic peroxide, such as for example 2,5-dimethyl-2,5-di(tert-butylperoxy)hexane, may be as follows. The exemplary method for melt processing this polymer comprises transporting the liquid organic peroxide 13 in undissolved admixture with the inert aqueous cooling carrier 4, for example demineralized water, from the controlled-temperature section 3 to the hopper of the extruder 9, extruding the molten polymer in the presence of the liquid organic peroxide 13 and the inert aqueous cooling carrier 4 in the extruder 9, and removing the inert aqueous cooling carrier 4 and any additional volatile compounds from the molten polymer. In order to form a mixture of the liquid organic peroxide 13 and the inert aqueous cooling carrier 4, the method may further comprise storing the liquid organic peroxide 13 in the storage 1 arranged in the controlled-temperature section 3, pumping the liquid organic peroxide 13 from the storage 1 to the mixer 5 at a predetermined flow rate, for example at 500 ppm related to the polymer processing equipment throughput, feeding the inert aqueous cooling carrier 4 to the mixer 5 at a predetermined flow rate, for example, at 2500 ppm relating to the polymer processing equipment throughput, and mixing the liquid organic peroxide 13 and the inert aqueous cooling carrier 4 in the mixer 5.

The liquid organic peroxide 13 with undissolved admixed inert aqueous cooling carrier 4 is fed along with polypropylene powder or pellets 7 into the extruder feed hopper 8, for example under nitrogen blanketing, by means of the pipe 6. Together with the liquid organic peroxide 13, the inert aqueous cooling carrier 4 and the polymer powder or pellets 7, any stabilizers and/or additional additives may be also fed through the feed hopper 8 into the extruder 9. The extruder 9 takes in the composed material by means of the rotating screw(s), for example at an extrusion temperature ranging from 190° C. to 260° C. The polymer, the liquid organic peroxide 13 and the inert aqueous cooling carrier 4 are mixed by the screw of the extruder 9.

The extrusion pressure and temperature may be varying along the length of the extruder 9. For example, the melt pressure in the melt compression zone may be of about 100 bar at temperatures of about 230° C. During the reactive extrusion process, the liquid organic peroxide 13 causes rheological modification of the molten polymer.

Since the extruder 9 comprises the venting zone 10 downstream the extruder feed hopper 8, the demineralized water previously acting as inert aqueous cooling carrier 4 for the liquid organic peroxide 13 along the pipe 6 can be extracted as vapor 11 from the polymer melt. Furthermore, other volatile compounds and reaction products from the peroxide degradation reaction may be removed along with the water. The vacuum pressure necessary for a complete extraction of an inert cooling carrier consisting of demineralized water as well as other volatile compounds may be selected at subatmospheric pressures in the venting zone, for example between 1000 mbar(a) to 800 mbar(a), and for example between 800 mbar(a) and 600 mbar(a). For example, the subatmospheric pressure in the venting zone can be maintained at the desired level by attaching the at least one vent port to a tube leading to a vacuum pump or other known devices for producing vacuum. The vented polymer exits the extruder 9 through a pelletizer (not shown) in the form of pellets.

As a consequence, an improved reduction of VOCs, an enhanced reduction of odors and an improved color of the final polymer pellets may be achieved.

In the embodiments described, 2,5-dimethyl-2,5-di(tert-butylperoxy) hexane has been described as liquid organic peroxide for modifying the rheology of a polymer such as polypropylene under extrusion conditions. However, different polymers may be rheologically modified by different organic peroxides according to embodiments of the method of the present disclosure. Also, embodiments have been described based on the use of a single organic peroxide. However, a plurality of organic peroxides may be used in accordance with one or more embodiments of the method of the present disclosure. Further, also stabilizers and/or additional additives may be used in accordance with one or more embodiments of the method of the present disclosure.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for feeding a liquid organic peroxide to a polymer melt processing equipment, the method comprising:

storing at least one liquid organic peroxide in a storage arranged in a controlled-temperature section;

mixing the at least one liquid organic peroxide and an inert cooling carrier in a mixing section arranged in the controlled-temperature section, wherein mixing is performed without dissolving the at least one liquid organic peroxide in the inert cooling carrier; and transporting the at least one liquid organic peroxide in undissolved admixture with the inert cooling carrier from the controlled-temperature section to a polymer melt processing equipment arranged outside the controlled-temperature section, wherein the inert cooling carrier comprises an aqueous liquid is volatile under melt processing conditions.

2. The method of claim 1, wherein the inert cooling carrier consists of demineralized water.

3. The method of claim 1, wherein the polymer melt processing equipment comprises an extruder.

4. The method of claim 1, wherein mixing is mechanical mixing.

5. The method of claim 1, wherein the method further comprises feeding the inert cooling carrier to the mixing section at a predetermined flow rate.

6. The method of claim 1, wherein the method further comprises pumping the least one liquid organic peroxide from the storage to the mixing section at a predetermined flow rate.

7. The method of claim 1, wherein the polymer is a polyolefin.

8. A method for melt processing a molten polymer comprising the method for feeding at least one liquid organic peroxide to a polymer melt processing equipment as defined in claim 1, wherein the method for melt processing the molten polymer further comprises melt processing the molten polymer in the presence of the at least one organic peroxide and the inert cooling carrier in the polymer melt processing equipment, and removing the inert cooling carrier from the molten polymer.

9. The method of claim 8, wherein melt processing comprises extruding.

10. The method of claim 8, wherein removing is performed by venting the polymer melt processing equipment.

* * * * *